Dec. 3, 1957  W. S. NIXON, JR  2,814,968
FOLDING EYEGLASS FRAME
Filed Sept. 4, 1953
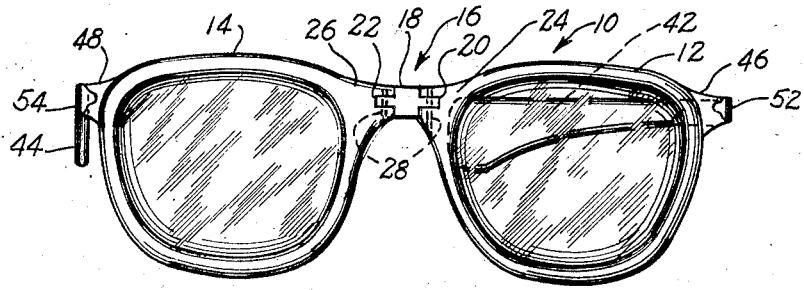
Fig. 1
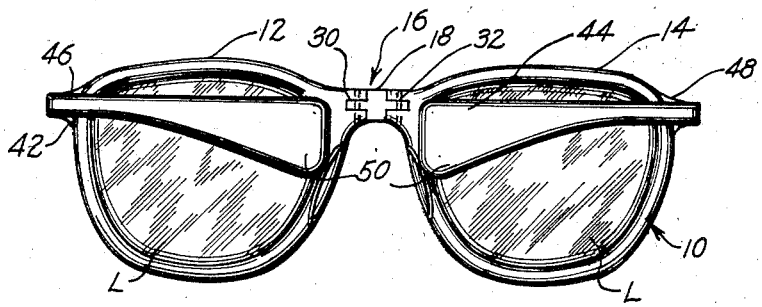
Fig. 2
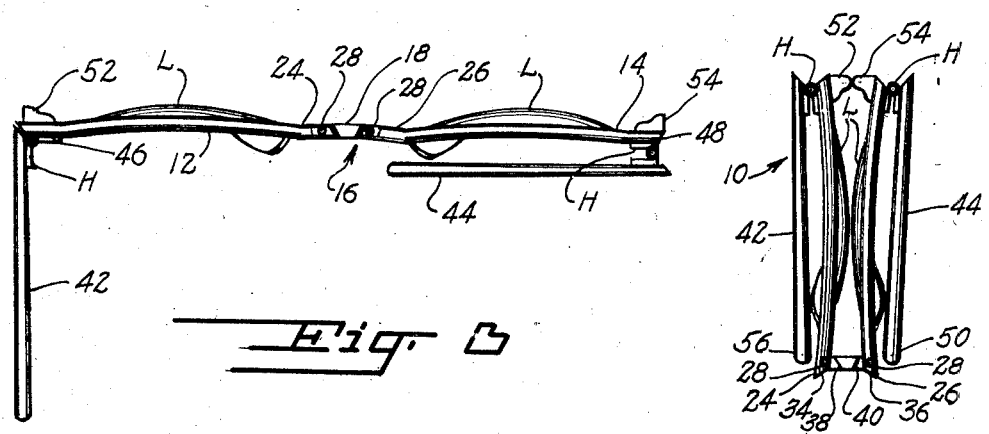
Fig. 3
Fig. 4
INVENTOR.
William S. Nixon Jr.
BY
McMorrow, Berman + Davidson
ATTORNEYS

United States Patent Office 2,814,968
Patented Dec. 3, 1957

2,814,968

FOLDING EYEGLASS FRAME

William S. Nixon, Jr., Uniontown, Pa.

Application September 4, 1953, Serial No. 378,578

2 Claims. (Cl. 88—44)

This invention relates to an improved folding eyeglass frame.

Folding eyeglass frames according to this invention are designed especially but not exclusively for the convenience of persons who use glasses only for reading or to avoid sun glare and who continually don and doff the glasses. Also, the eyeglass frame of the present invention is designed to be compact when folded for carrying loose in a pocket and arranged so that their lenses are protected against being crushed.

Other objects and advantages will become apparent from the following detailed description, forming the specification, taken in conjunction with the accompanying drawing, in which:

Figure 1 is a front elevational view of an eyeglass frame in accordance with this invention;

Figure 2 is a rear elevational view thereof;

Figure 3 is a top plan view of Figure 2; and

Figure 4 is a top plan view showing the frame in its folded position.

The illustrated eyeglass frame, generally indicated at 10, may be made of any desirable material, preferably plastic material. The frame 10 comprises a pair of spaced lens rings 12 and 14 in which convex lenses L are mounted. The lens rims 12 and 14 are connected by a bridge, generally indicated at 16, which extends from one eyepiece to the other. The inner sides of the rims 12 and 14 have thereon laterally inwardly projecting lugs 24 and 26, respectively, which are elevated above the horizontal center line of the lens rims. The lugs terminate at their laterally inward ends in upper and lower spaced arms, and pins 28 traverse the arms of each lug. A horizontally elongated bridge piece 18, preferably of the same cross section as the lugs 24 and 26, has ears 20 and 22 on its opposite ends which engage between the arms 21 and 23 of the lugs and are traversed by the pivot pins 28. The bridge piece 18 and the lugs 24 and 26 define the bridge 16 of the frame 10.

As clearly shown in Figure 4, the terminal ends 34 and 36 of the lugs 24 and 26, respectively, are beveled to forty-five degrees and the related ends of the bridge piece 18, indicated at 38 and 40, are oppositely beveled at forty-five degrees so that the lens rims are stopped in alignment with each other when unfolded one-hundred and eighty-degrees from their folded positions, by engagement of the beveled ends 34, 38 and 36, 40.

Short temples 42 and 44, not substantially longer than the width of the lens rims, have conventional hinges H on their outer ends which are mounted on laterally outwardly projecting lugs 46 and 48 on the laterally outward sides of the lens rims 12 and 14. The outer ends of the temples and the laterally outward ends of the lugs 46 and 48 are oppositely beveled at approximately forty-five degrees, so that the temples are stopped, when unfolded, at ninety-degree angles to the lens rims, in positions to exert pressure upon the temples of a wearer. The temples 42 and 44 are considerably shorter than the usual eyeglass frame temples and when folded extend across the rear sides of the lens rims.

On the forward sides of the temple lugs 46 and 48 are forwardly projecting stop shoulders 52 and 54, respectively, which engage when the frame is folded, and keep the convex or front surfaces of the lenses L spaced apart from each other.

While there are shown and described the preferred embodiment of the invention, it is to be understood that the structure is susceptible to change and modification within the practicability of the invention and is limited only by the scope of the claims appended hereto.

What is claimed is:

1. In a folding eyeglass frame, a pair of laterally spaced lens rims having laterally inward and outward and front and rear sides, bridge lugs on and projecting laterally inwardly from the inward sides of the lens rims, said bridge lugs terminating at their laterally inward ends in vertically spaced arms, said arms having inward ends, a bridge piece having opposite ends, said bridge piece being positioned between the bridge lugs, ears on the ends of the bridge piece engaged between the arms of the bridge lugs, vertical pivot pins traversing the arms and the ears whereby the lens frames can be pivoted forwardly from an unfolded position in which the lens rims are aligned with each other to a folded position in which the front sides of the lens rims are in facing relation to each other, the inward ends of the arms and the ends of the bridge piece being oppositely beveled to stop the lens rims in their unfolded position when moved from their folded position, lenses in said lens rims having convex surfaces projecting forwardly beyond the front sides of the lens rims, and stop shoulders on the outer sides of the lens rims and projecting forwardly from the front sides of the lens rims and arranged to engage each other in the folded positions of the lens frames and space the convex surfaces of the lenses apart.

2. In a folding eyeglass frame, a pair of laterally spaced lens rims having laterally inward and outward and front and rear sides, bridge lugs on and projecting laterally inwardly from the inward sides of the lens rims, said bridge lugs terminating at their laterally inward ends in vertically spaced arms, said arms having inward ends, a bridge piece having opposite ends, said bridge piece being positioned between the bridge lugs, ears on the ends of the bridge piece engaged between the arms of the bridge lugs, vertical pivot pins traversing the arms and the ears whereby the lens frames can be pivoted forwardly from an unfolded position in which the lens rims are aligned with each other to a folded position in which the front sides of the lens rims are in facing relation to each other, the inward ends of the arms and the ends of the bridge piece being oppositely beveled to stop the lens rims in their unfolded position when moved from their folded position, lenses in said lens rims having convex surfaces projecting forwardly beyond the front sides of the lens rims, and stop shoulders on the outer sides of the lens rim and projecting forwardly from the front sides of the lens rims and arranged to engage each other in the folded positions of the lens frames and space the convex surfaces of the lenses apart, temple lugs on and projecting laterally outwardly from the outer sides of the lens rims, the temple lugs having outer ends, hinges mounted on the temple lugs, and temples having outer ends secured to the hinges and free inner ends, the temples being not substantially longer than the widths of the lens rims, said temples being arranged to lie protectively across the rear sides of the lens rims in the folded positions of the temples with the free ends of the temples reaching only to the inner sides of the lens rims, and stop means associated with the outer ends of the temples and the outer ends of the temple lugs for stopping the temples in their unfolded positions substantially at right angles to the lens rims.

References Cited in the file of this patent

UNITED STATES PATENTS

| | | |
|---|---|---|
| 22,485 | Burt et al. | Jan. 4, 1859 |
| 1,113,194 | Carson | Oct. 13, 1914 |
| 1,152,521 | Leibe | Sept. 7, 1915 |
| 1,953,995 | Tanasso et al. | Apr. 10, 1934 |
| 1,992,260 | Thompson | Feb. 26, 1935 |
| 2,112,644 | Bausch | Mar. 29, 1938 |
| 2,275,999 | Strauss | Mar. 10, 1942 |

FOREIGN PATENTS

| | | |
|---|---|---|
| 340,704 | Great Britain | Jan. 8, 1931 |